(12) United States Patent
Takahashi et al.

(10) Patent No.: US 9,787,233 B2
(45) Date of Patent: Oct. 10, 2017

(54) MOVABLE OBJECT DRIVING DEVICE AND GAME MACHINE

(75) Inventors: Norihisa Takahashi, San Ramon, CA (US); Katsumi Matsushita, Gifu (JP); Yasuyuki Ohba, Aichi (JP); Hiroyuki Ibuki, Aichi (JP)

(73) Assignee: OMRON Corporation, Kyoto (JP)

( * ) Notice: Subject to any disclaimer, the term of this patent is extended or adjusted under 35 U.S.C. 154(b) by 355 days.

(21) Appl. No.: 14/236,153

(22) PCT Filed: Jun. 22, 2012

(86) PCT No.: PCT/JP2012/066045
§ 371 (c)(1),
(2), (4) Date: Mar. 21, 2014

(87) PCT Pub. No.: WO2013/031352
PCT Pub. Date: Mar. 7, 2013

(65) Prior Publication Data
US 2014/0232063 A1  Aug. 21, 2014

(30) Foreign Application Priority Data

Aug. 30, 2011 (JP) ................................ 2011-187878
Aug. 30, 2011 (JP) ................................ 2011-187901

(51) Int. Cl.
*G07F 17/32* (2006.01)
*H02P 8/14* (2006.01)
*A63F 11/00* (2006.01)

(52) U.S. Cl.
CPC ................ *H02P 8/14* (2013.01); *A63F 11/00* (2013.01); *G07F 17/3202* (2013.01)

(58) Field of Classification Search
None
See application file for complete search history.

(56) References Cited

U.S. PATENT DOCUMENTS

| 4,448,419 A | * | 5/1984 | Telnaes | ............... G07F 17/3244 |
| | | | | 273/143 R |
| 5,934,672 A | * | 8/1999 | Sines | .................. G07F 17/3211 |
| | | | | 273/138.1 |

(Continued)

FOREIGN PATENT DOCUMENTS

| JP | H06-189597 A | 7/1994 |
| JP | 2001-104565 A | 4/2001 |

(Continued)

OTHER PUBLICATIONS

English Translation of JP 2010-220884 (Machine Generated), 62 pages.*

(Continued)

*Primary Examiner* — Jason Skaarup
(74) *Attorney, Agent, or Firm* — Osha Liang LLP

(57) ABSTRACT

A movable body drive device that controls a drive unit configured to drive a movable body arranged on a game machine has a communication unit that receives a control command for regulating a destination position of the movable body, a storage unit that stores a current position of the movable body, and a control unit that determines, based on a difference between the destination position and the current position or a moving direction in an immediately previous action of the movable body, a moving direction in the next action of the movable body and to control the drive unit such that the movable body is moved along the moving direction in the next action until the movable body reaches the destination position.

4 Claims, 10 Drawing Sheets

(56) References Cited

U.S. PATENT DOCUMENTS

| | | | |
|---|---|---|---|
| 7,053,585 B2* | 5/2006 | Nireki | G07F 17/3213 273/142 R |
| 7,137,885 B1* | 11/2006 | Loose | G07F 17/3202 463/16 |
| 2003/0220134 A1* | 11/2003 | Walker | G07F 17/34 463/20 |
| 2004/0033828 A1* | 2/2004 | Gagner | G07F 17/3211 463/20 |
| 2005/0285337 A1* | 12/2005 | Durham | G07F 17/34 273/143 R |
| 2005/0288089 A1* | 12/2005 | Cammegh | A63F 5/00 463/17 |
| 2006/0073867 A1* | 4/2006 | Rothkranz | G07F 17/3211 463/16 |
| 2006/0223428 A1* | 10/2006 | Fujii | G07D 1/00 453/57 |
| 2007/0060323 A1* | 3/2007 | Isaac | G07F 17/3202 463/29 |
| 2007/0149281 A1* | 6/2007 | Gadda | G07F 17/32 463/34 |
| 2008/0214264 A1* | 9/2008 | Griswold | A63F 5/00 463/17 |
| 2009/0104964 A1* | 4/2009 | Snow | G07F 17/32 463/20 |
| 2009/0137311 A1* | 5/2009 | Iverson | G07F 17/3213 463/20 |
| 2011/0118013 A1* | 5/2011 | Mattice | G07F 17/3202 463/30 |

FOREIGN PATENT DOCUMENTS

| | | | |
|---|---|---|---|
| JP | 2002239111 A | * | 8/2002 |
| JP | 2009-247833 A | | 10/2009 |
| JP | 2010-213755 A | | 9/2010 |
| JP | 2010-220884 A | | 10/2010 |

OTHER PUBLICATIONS

English Translation of JP 2010-213755 (Machine Generated), 50 pages.*

English Translation of JP 2001-104565 (Machine Generated), 24 pages.*

English Translation of JP 2002-239111 A (Machine Generated), 12 pages.*

"AVR446: Linear speed control of stepper motor" published by Atmel on or before Dec. 31, 2006, printed from URL <http://www.atmel.com/images/doc8017.pdf>, 15 pages.*

"Linear Motor Control Without the Math" written by Pramod Ranade, published on or before Apr. 30, 2009 in Embedded System Design from www.embedded.com as pp. 23-32, printed from URL <http://m.eet.com/media/1116372/cmp_esd0409.pdf>, 10 pages.*

"Generate stepper-motor speed profiles in real time" written by David Austin, published on Dec. 30, 2004, avaiable at URL <http://www.embedded.com/design/mcus-processors-and-socs/4006438/Generate-stepper-motor-speed-profiles-in-real-time>, and printed from URL <http://www.embedded.com/print/4006438>, 12 pages.*

International Search Report issued in PCT/JP2012/066045 mailed on Oct. 2, 2012 (2 pages).

* cited by examiner

MOVABLE OBJECT DRIVING DEVICE AND GAME MACHINE

BACKGROUND

Technical Field

The present invention relates to a movable body drive device to drive a movable body and a game machine having such a movable body drive device.

Related Art

A game machine such as a reel gaming machine or a pinball game machine is devised to perform renditions that appeal to the visual sense, acoustic sense, or feeling of a player so as to improve the interest of the player. In particular, in order to perform a rendition that appeals to the visual sense of a player, the game machine may have a moving (movable) body, for example, a movable accessory. The movable body is driven by, for example, a stepping motor. A processor unit for rendition (to be simply referred to as a rendition CPU hereinafter) serving as an example of a host control device transmits, to a control circuit of the stepping motor, an instruction for rotating the stepping motor by the number of steps corresponding to a moving distance by which a movable body moves to a designated position depending on a state of game.

In recent years, in order to improve the interest of a player, objects which are mounted on a game machine and to be controlled by a rendition CPU tend to increase in number. For example, on the game machine, in addition to movable accessories, a large number of light sources and a display device such as a liquid crystal display are mounted. For this reason, the number of terminals output from the rendition CPU and a load such as an amount of calculation of the rendition CPU tend to increase. Thus, it is requested to reduce an amount of calculation required to cause a movable body to perform a desired action. At the request, a technique to reduce resources of hardware or software required to control a stepping motor is developed (for example, see Patent Documents 1 and 2).

For example, in a stepping motor drive control device disclosed in Japanese Unexamined Patent Publication No. 6-189597, a microcomputer generates a four-phase drive control signal depending on an input signal for forward/backward rotation, speed switching, mode switching, or the like to achieve a change of an excitation method, a rotating method, or a rotational speed without increasing the number of circuit components.

In a movable body drive device disclosed in Japanese Unexamined Patent Publication No. 2009-247833, an action result of a movable body is transmitted to a host control device, and, based on a command from the control device or the action result, a driving unit drives the movable body.

SUMMARY

However, in the techniques disclosed in Japanese Unexamined Patent Publication Nos. 6-189597 and 2009-247833, in order to cause the rendition CPU to move the movable body to a desired destination position, the rendition CPU itself needs to comprehend a current position of the movable body. For this purpose, each time the movable body is moved, the rendition CPU needs to receive information related to the current position of the movable body from a control circuit for a stepping motor or a sensor to detect the position of the movable body. The rendition CPU, based on a difference between the coordinates of a current position of the movable body and the coordinates of a destination position, needs to perform calculations to determine a rotating direction, the number of steps, and the like of the stepping motor for driving the movable body. In this manner, each time the movable body is moved, the rendition CPU needs to receive information related to a current position of the movable body and to perform process to determine a rotating direction, the number of steps, and the like of the stepping motor. For this reason, when the movable body is to be driven, a further reduction in load of a host control device such as rendition CPU is demanded.

According to one or more embodiments of the present invention, a movable body drive device is capable of reducing the load of a host control device and a game machine having such a movable body drive device.

According to one or more embodiments of the present invention, a movable body drive device controls a driving unit for driving a movable body arranged in game machine. The movable body drive device includes a communication unit configured to receive a control command for regulating a destination position of a movable body, a storage unit configured to store a current position of the movable body, and a control unit configured to determine, based on a difference between the destination position and a current position of the movable body or a moving direction in an immediately previous action of the movable body, a moving direction in the next action of the movable body and to control a drive unit such that the movable body is moved along the moving direction in the next action until the movable body reaches the destination position.

In a movable body drive device according to one or more embodiments of the present invention, the drive unit is a stepping motor, the control command includes a first index representing a rotational speed of the stepping motor and a second index representing acceleration or deceleration of the stepping motor, and the control unit controls the stepping motor such that the rotational speed of the stepping motor is accelerated or decelerated at the acceleration or the deceleration represented by the second index until the movable body moves from the current position for a distance corresponding to the first number of steps of the stepping motor and becomes the rotational speed represented by the first index when the movable body moves for the distance.

In a movable body drive device according to one or more embodiments of the present invention, the drive unit is a stepping motor, the control command includes a first index representing a rotational speed of the stepping motor and a second index representing acceleration or deceleration of the stepping motor, and the control unit controls the stepping motor such that the rotational speed of the stepping motor is accelerated or decelerated at the acceleration or the deceleration represented by the second index when the movable body comes close to the destination position at a distance shorter than a distance corresponding to the second number of steps of the stepping motor and the rotational speed becomes the rotational speed represented by the first index when the movable body reaches the destination position.

In a movable body drive device according to one or more embodiments of the present invention, the drive unit is a stepping motor, the control command includes a first index representing a rotational speed of the stepping motor and a third index representing deceleration of the stepping motor, and the control unit controls the stepping motor such that the rotational speed of the stepping motor is decelerated at the deceleration represented by the third index when the movable body comes close to the destination position at a distance shorter than a distance corresponding to the third number of steps of the stepping motor and the rotational speed becomes zero when the movable body reaches the destination position.

Furthermore, in a movable body drive device according to one or more embodiments of the present invention, the drive unit is a stepping motor, and the control command includes a fourth index representing a ratio of a period in which a voltage is applied to the stepping motor to a first period corresponding to an action of one step of the stepping motor. In this case, according to one or more embodiments of the present invention, the movable body drive device further includes a duty ratio control unit configured to set a second period shorter than the first period as one cycle and to generate a continuous pulse signal obtained by continuing pulses each having a predetermined voltage value with the ratio represented by the fourth index in the second period. According to one or more embodiments of the present invention, the control unit performs pulse width modulation to a drive signal for controlling an action in each step of the stepping motor by the continuous pulse signal and outputs the pulse-width-modulated drive signal to the stepping motor.

Furthermore, in a movable body drive device according to one or more embodiments of the present invention, the destination position regulated by the control command is expressed by a moving distance of the movable body with reference to a current position, a storage unit further stores a position in an immediately previous action of the movable body, and the control unit calculates a moving direction in the immediately previous action of the movable body by a difference between the position in the immediately previous action and the current position.

According to one or more embodiments of the present invention, a game machine includes a game machine main body, a movable body movably arranged on the front surface of the game machine main body within a predetermined movable range, a drive unit configured to drive the movable body, a movable body drive device configured to control the drive unit, and a rendition control unit configured to control a rendition depending on a state of game.

In the game machine, the rendition control unit, depending on the state of game, generate a control command for regulating a destination position of the movable body and serially transmits the control command to the movable body drive device. The movable body drive device includes a communication unit configured to receive a control command, a storage unit configured to store a current position of the movable body, and a control unit configured to determine, based on a difference between the destination position and a current position of the movable body or a moving direction in an immediately previous action of the movable body, a moving direction in the next action of the movable body and to control a drive unit configured to drive the movable body such that the movable body is moved along the moving direction in the next action until the movable body reaches the destination position.

Furthermore, in a game machine according to one or more embodiments of the present invention, the drive unit is a stepping motor, and the control command includes a fourth index representing a ratio of a period in which a voltage is applied to the stepping motor to a first period corresponding to an action of one step of the stepping motor. In this case, according to one or more embodiments of the present invention, the movable body drive device further includes a duty ratio control unit configured to set a second period shorter than the first period as one cycle and to generate a continuous pulse signal obtained by continuing pulses each having a predetermined voltage value with the ratio represented by the fourth index in the second period. According to one or more embodiments of the present invention, the control unit of the movable body drive device performs pulse width modulation to a drive signal for controlling an action in each step of the stepping motor by the continuous pulse signal and outputs the pulse-width-modulated drive signal to the stepping motor.

The movable body drive device and the game machine according to one or more embodiments of the present invention exert an effect that can further reduce a load of a host control device.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. The movable body drive device calculates a current position of a movable body based on a detection signal from a sensor that detects a position of the movable body and an action of a drive unit such as a stepping motor for driving the movable body and stores the current position. The movable body drive device determines, based on a difference between information representing a destination position of the movable body and the current position of the movable body received from a host control device such as a rendition CPU or a moving direction in an immediately previous action of the movable body at the current position, and drives the movable body until the movable body reaches the destination position. In this manner, even though the host control device does not comprehend the current position of the movable body, the movable body drive device makes the movable body possible to move a desired destination position to reduce a load of the host control device.

Figure 1:
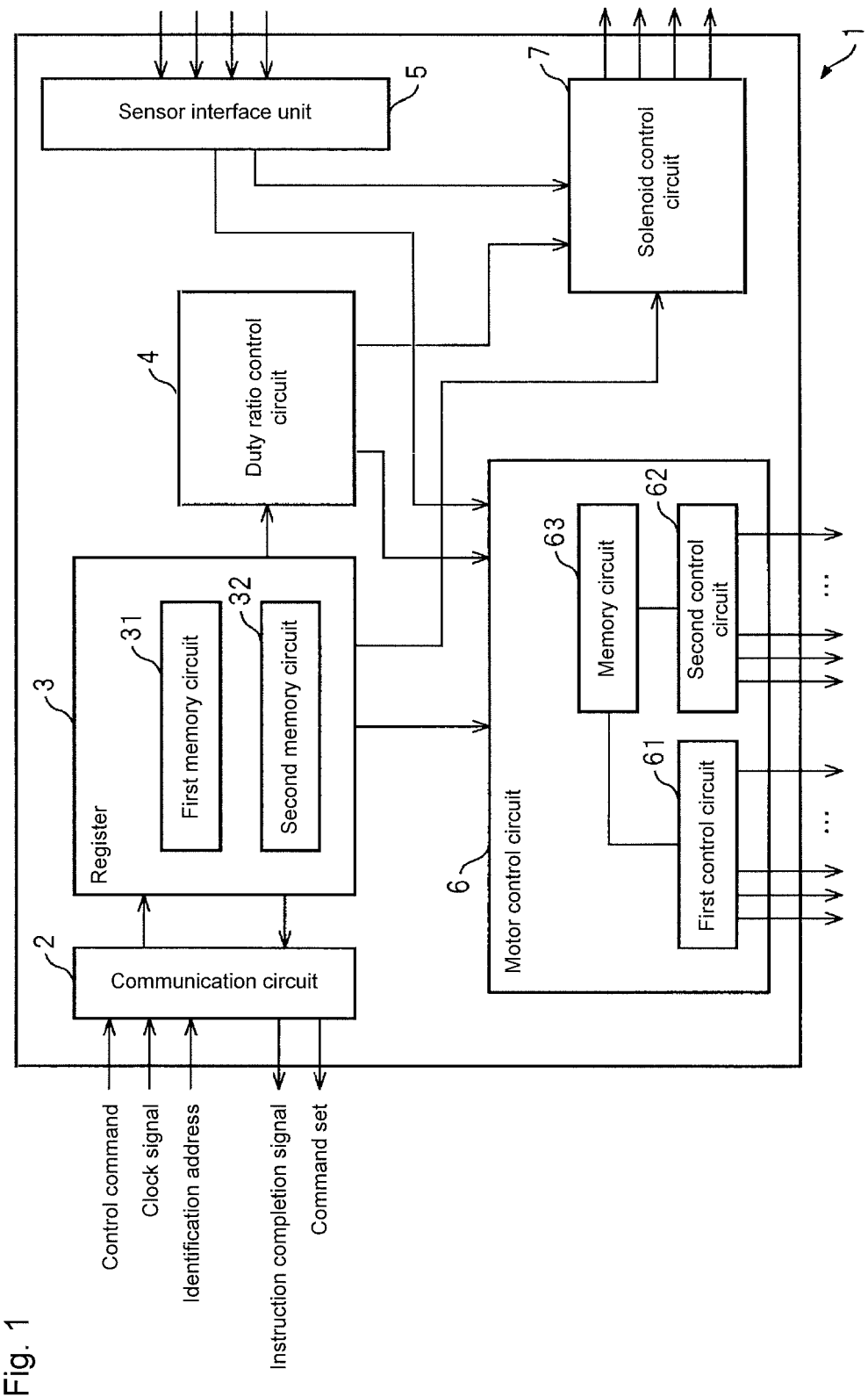
FIG. 1 is a schematic block diagram of a movable body drive device according to one or more embodiments of the present invention.

FIG. 1 is a schematic block diagram of a movable body drive device according to one or more embodiments of the present invention. As shown in FIG. 1, a movable body drive device 1 includes a communication circuit 2, a register 3, a duty ratio control circuit 4, a sensor interface unit 5, a motor control circuit 6, and a solenoid control circuit 7.

These components held by the movable body drive device 1 may be mounted as independent circuits on a circuit board (not shown), or may be mounted on the circuit board as an integrated circuit obtained by integrating the components.

In one or more embodiments of the present invention, the movable body drive device 1 has a function of controlling a plurality of drive units. The plurality of drive units are two stepping motors and one solenoid, respectively. The solenoid, for example, excites a coil to attract a movable body configured by a magnetic body so as to drive the movable body. For this reason, for example, the solenoid has a plurality of coils arranged at different positions from each other along a movable range of the movable body, and the coils are sequentially excited along a moving direction of the movable body to cause the movable body to move along the moving direction.

In the movable body drive device 1, methods of designating coordinates of a destination position related to the movable body driven by the stepping motor include an absolute coordinate designation mode that designates the coordinates of the destination position with an absolute coordinate value, a relative coordinate designation mode that designates the coordinates of the destination position with a relative moving distance and a moving direction determined with reference to the current position, and an inertial movement mode that designates the coordinates of the destination position of the movable body with only a relative moving distance determined with reference to the current position. These modes will be described first.

Figure 2A:
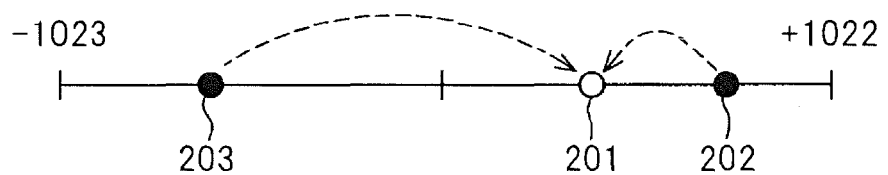
FIG. 2A is a diagram showing an example of a relationship between the coordinates of a current position and the coordinates of a destination position in an absolute coordinate designation mode.
Figure 2B:
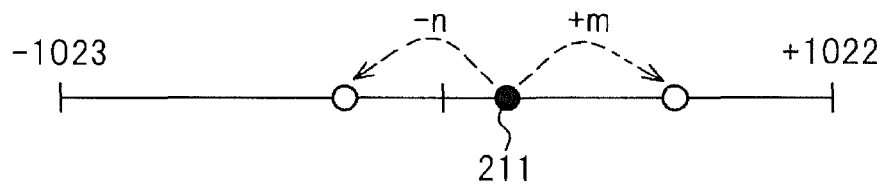
FIG. 2B is a diagram showing an example of a relationship between the coordinates of a current position and the coordinates of a destination position in a relative coordinate designation mode.
Figure 2C:
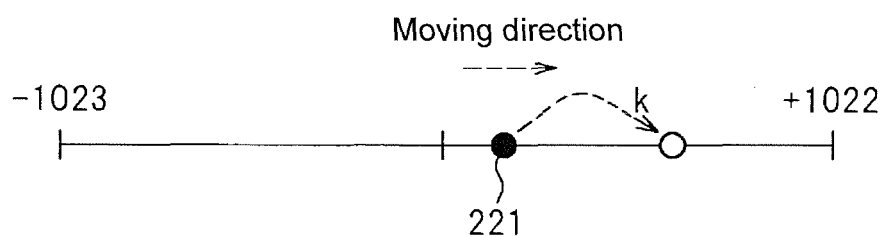
FIG. 2C is a diagram showing an example of a relationship between the coordinates of a current position and the coordinates of a destination position in an inertial movement mode.

FIG. 2A is a diagram showing an example of a relationship between the coordinates of a current position and the coordinates of a destination position in the absolute coordinate designation mode. FIG. 2B is a diagram showing an example of a relationship between the coordinates of a current position and the coordinates of a destination position in the relative coordinate designation mode. FIG. 2C is a diagram showing an example of a relationship between the coordinates of a current position and the coordinates of a destination position in the inertial movement mode. In FIG. 2A to FIG. 2C, on the abscissa, position coordinates of the movable body are expressed with the number of steps (−1023 to 1022) of the stepping motor. In this example, the movable body linearly moves along the horizontal direction. However, the movable body driven by the movable body drive device 1 may linearly move along an arbitrary method or may rotationally move.

In the absolute coordinate designation mode shown in FIG. 2A, as in a case where coordinates 202 indicate a current position of the movable body, when the current position of the movable body is located on the right of coordinates 201 of a destination position designated by absolute coordinates, the movable body drive device 1 determines a moving direction of the movable body as the right hand based on a comparison result between the coordinates of the destination position and the coordinates of the current position. The movable body drive device 1, even though the rendition CPU does not designate the moving direction of the movable body, automatically moves the movable body to the left until the movable body reaches the destination position. In contrast to this, as in a case where coordinates 203 indicate the current position of the movable body, when the current position of the movable body is located on the left of the coordinates 201 of a destination position designated by absolute coordinates, the movable body drive device 1 determines the moving direction of the movable body as the right hand to automatically move the movable body to the right until the movable body reaches the destination position.

In the relative coordinate designation mode shown in FIG. 2B, the rendition CPU designates the destination position with a relative moving distance and the relative moving direction with respect to the current position of the movable body. The relative moving distance is expressed with, for example, the number of steps of a stepping motor. The moving direction is expressed with the sign (+ or −) of the number of steps. For example, when +m steps (m is a positive integer) are designated as the relative moving direction and the relative moving distance to coordinates 211 of the current position of the movable body, the movable body drive device 1 moves the movable body to the right by the m steps. For example, when −n steps (n is a positive integer) are designated as the relative moving direction and the relative moving distance to the coordinates 211 of the current position of the movable body, the movable body drive device 1 moves the movable body to the left by the n steps.

In the inertial movement mode shown in FIG. 2C, the rendition CPU designates only a relative moving distance with respect to the current position of the movable body. In the mode, the movable body drive device 1 determines the moving direction in the immediately previous action of the movable body as a moving direction in the next action to move the movable body by k steps (k is a positive integer) corresponding to a moving distance designated by a current position 221. In this manner, the movable body drive device 1 can stop the movable body without sharply changing the moving direction of the movable body. The inertial movement mode, for example, is applied when the movable body is urgently stopped.

The rendition CPU, with respect to each movable body driven by the stepping motor, generates a control command for designating a destination position of the movable body according to any one of the modes described above and transmits the control command to the movable body drive device 1 to make it possible to move the movable body to the destination position.

Each part of the movable body drive device 1 will be described below.

The communication circuit 2, for example, connects the movable body drive device 1 to a rendition CPU of a game machine on which the movable body drive device 1 is mounted. The communication circuit 2 receives, from the rendition CPU, a serially transmitted control command having a plurality of bits and a clock signal to synchronize each of the plurality of bits included in the control command to analyze the control command.

The control command, for example, includes action information to specify an action of a movable body driven by any one of the drive units or setting information for regulating a setting about the drive unit. A combination of the action information and the setting information for one drive unit will be conveniently called a command set hereinafter. One command set regulates one action of the movable body.

As the clock signal, for example, a signal having a rectangular pulse for each set of a predetermined number of bits in the control command can be used.

Figure 3:
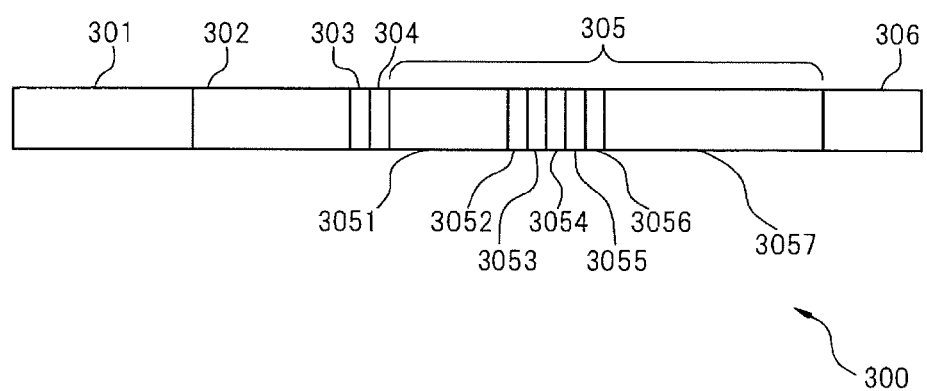
FIG. 3 is a diagram showing an example of a format of a control command including action information.

FIG. 3 is a diagram showing an example of a format of a control command including action information when the drive unit is a stepping motor. A control command 300 has a START flag 301, a device address 302, an action/setting switching flag 303, a series designation flag 304, control data 305, and an END flag 306 that are sequentially arranged from the start. Furthermore, the control command 300 may have a 1-bit spacer having a value of, for example, '0' between an adjacent flag, an address, and data.

The START flag 301 is a bit string representing the start of the control command 300. In one or more embodiments of the present invention, a bit string in which 9 bits having a value of '1' are continued is used. The START flag 301 may be a bit string that is not matched with another arbitrary bit string in the control command 300.

The device address 302 is identification information to specify a movable body drive device to be controlled by the control command 300. In one or more embodiments of the present invention, the device address 302 is expressed by a bit string having an 8-bit length. The communication circuit 2 determines whether the device address 302 is matched with an identification address separately received from the rendition CPU. When the device address 302 is matched with the identification address, the movable body drive device 1 is determined to be controlled by the control command 300.

The action/setting switching flag 303 is a 1-bit flag representing whether the control command includes the action information or the setting information. In one or more embodiments of the present invention, when the action/setting switching flag 303 is '0', the control command includes the action information. When the action/setting switching flag 303 includes '1', the control command includes the setting information. In the example in FIG. 3, since the control command 300 includes the action information, the action/setting switching flag 303 is '0'.

The series designation flag 304 is a 1-bit flag representing that the object to be controlled by the control command 300 is any one of two stepping motors that are controlled by the movable body drive device 1.

The control data 305 includes the action information of the stepping motor controlled by the movable body drive device 1. More specifically, the control data 305 includes speed data 3051, a save location designation flag 3052, a weight flag 3053, an automatic correction flag 3054, an automatic acceleration/deceleration flag 3055, a coordinate designation mode flag 3056, and coordinate data 3057.

The speed data 3051 represents a rotational speed of the stepping motor. In one or more embodiments of the present invention, the speed data 3051 is a bit string having a 6-bit length, and has any one of values '0' to '63'. When the speed data 3051 is '0', the speed data represents that the stepping motor is stopped, i.e., the movable body driven by the stepping motor is stopped. When the speed data 3051 is '1' to '63', the speed data represents that the stepping motor is rotated at a rotational speed corresponding to the value of the speed data 3051.

The save location designation flag 3052 is 1-bit flag for designating a save location of action information in the register 3. In one or more embodiments of the present invention, when the save location designation flag 3052 is '0', the action information is stored in a first memory circuit 31 that stores a command set for regulating a normal action of the movable body in the register 3. On the other hand, when the save location designation flag 3052 is '1', the action information is stored in a second memory circuit 32 that stores a command set for regulating an action of the movable body in an urgent stop state in the register 3.

The weight flag 3053 is a 1-bit flag representing whether a wait mode to stop the stepping motor for a designated period is set. In one or more embodiments of the present invention, when the weight flag 3053 is '0', the wait mode is turned off, and the movable body drive device 1 controls the stepping motor according to the rotational speed designated by the speed data 3051 and the number of steps designated by the coordinate data 3057. On the other hand, when the weight flag 3053 is '1', the weight flag 3053 represents that the wait mode is turned on to step the stepping motor in a period corresponding to a value obtained by multiplying an action period of one step corresponding to the rotational speed designated by the speed data 3051 by the number of steps designated by the coordinate data 3057. When the movable body moving along, for example, a specific direction is inversely moved in a direction opposite to the specific direction by using the wait mode, the movable body is temporarily stopped in a period designated in the wait mode immediately before the inverse movement to make it possible to cause the movable body drive device 1 to prevent an overload from being applied to the stepping motor. For this reason, the movable body drive device 1 can prevent the movable body from following the rotation of the stepping motor or prevent the stepping motor from being stepped out.

The automatic correction flag 3054 is a 1-bit flag representing whether the current position of the movable body is automatically corrected by a detection signal from a sensor (not shown) for detecting the position of the movable body. In one or more embodiments of the present invention, when the automatic correction flag 3054 is '0', the movable body drive device 1 does not correct the current position of the movable body. On the other hand, when the automatic correction flag 3054 is '1', the movable body drive device 1 corrects the current position of the variable body when the movable body drive device 1 receives the detection signal from the sensor.

The automatic acceleration/deceleration flag 3055 is a 1-bit flag representing whether an automatic acceleration/deceleration mode in which acceleration or deceleration is automatically performed at the start of movement or the end of movement of the movable body is on or off. In one or more embodiments of the present invention, when the automatic acceleration/deceleration flag 3055 is '0', the automatic acceleration/deceleration mode is turned off, and the movable body drive device 1 rotates the stepping motor that drives the movable body at a rotational speed designated by the speed data 3051 until the end of movement immediately after the start of movement of the movable body. On the other hand, when the automatic acceleration/deceleration flag 3055 is '1', the automatic acceleration/deceleration mode is turned on, the movable body drive device 1 adjusts the rotational speed of the stepping motor according to an independently designated acceleration value or deceleration value immediately after the start of movement of the movable body or immediately before the end of movement of the movable body. Details of action performed when the automatic acceleration/deceleration mode is on will be described below.

The coordinate designation mode flag 3056 is a 1-bit flag representing a mode for regulating a designating method of a destination position regulated by the coordinate data 3057. In one or more embodiments of the present invention, when the coordinate designation mode flag 3056 is '0', the coordinate designation mode flag 3056 represents that the coordinates of the destination position are an absolute coordinate value (more specifically, the absolute coordinate designation mode is applied). On the other hand, when the coordinate designation mode flag 3056 is '1', the coordinate designation mode flag 3056 represents that the coordinates of the destination position are a relative moving distance set with reference to the coordinates of the current position (more specifically, the relative coordinate designation mode or the inertial movement mode is applied). When the save location designation flag 3052 is '0', the relative coordinate designation mode is set. When the save location designation flag 3052 is '1', the inertial movement mode is set.

The coordinate data 3057 represents the coordinates of the destination position with the number of steps of the stepping motor. In one or more embodiments of the present invention, the coordinate data 3057 is a bit string having an 11-bit length, and represents the coordinates of the destination position with any one of the numbers of steps ranging from −1024 to 1023. When the inertial movement mode is applied, only the moving distance is regulated, and the coordinate data 3057 has any one of values 0 to 1023.

The END flag 306 is a bit string representing an end of the control command 300. The END flag 306 may be a START flag included in the control command and a bit string that is included in the control command and is not matched with another bit string.

Figure 4A:
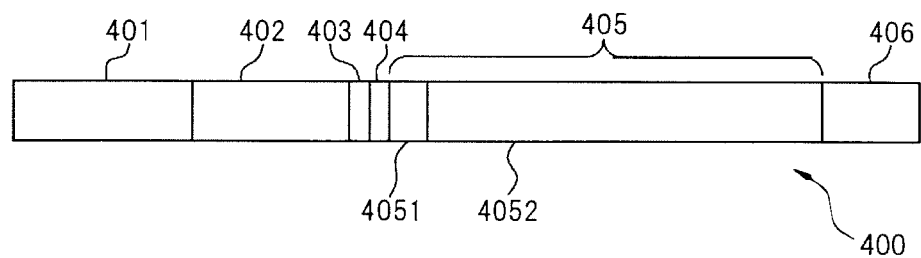
FIG. 4A is a diagram showing an example of a format of a control command including setting information.

FIG. 4A is a diagram showing an example of a format of a control command including setting information when the drive unit is a stepping motor. A control command 400 has a START flag 401, a device address 402, an action/setting switching flag 403, a series designation flag 404, control data 405, and an END flag 406 that are sequentially arranged from the start. The control command 400 including the setting information is different from the control command 300 including the action information shown in FIG. 3 in that the value of the action/setting switching flag 403 is '1' and in the contents of the control data 405. The control data 405 will be described below.

The control data 405 includes a setting mode flag 4051 having a 2-bit length and setting data 4052.

The setting mode flag 4051 regulates whether an individual setting mode in which a setting for each individual command is performed is set or whether an initial setting mode in which a common setting for all control commands is set. In one or more embodiments of the present invention, when the setting mode flag 4051 is '00', the setting mode flag 4051 represents that the individual setting mode is set. On the other hand, when the setting mode flag 4051 is '01', the setting mode flag 4051 represents that the initial setting mode is set.

Figure 4B:
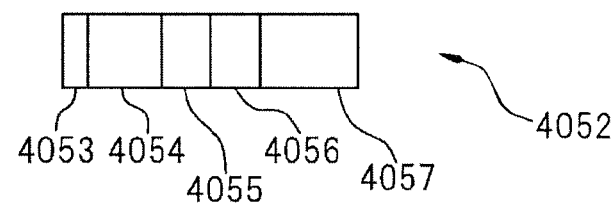
FIG. 4B is a diagram showing an example of a format of setting data when regulation is performed in an individual setting mode.

FIG. 4B is a diagram showing an example of a format of the setting data 4052 when the setting data 4052 is regulated in an individual setting mode. In the individual setting mode, the setting data 4052 includes a save location designation flag 4053, a stop-state torque 4054, an action-state torque 4055, an excitation mode flag 4056, and acceleration data 4057 that are sequentially arranged from the start.

The save location designation flag 4053, like the save location designation flag 3052 shown in FIG. 3, a 1-bit flag for designating a save location of setting information in the register 3. In one or more embodiments of the present invention, when the save location designation flag 4053 is '0', the setting information is stored in the first memory circuit 31 in the register 3. On the other hand, when the save location designation flag 4052 is '1', the setting information is stored in the second memory circuit 32 in the register 3.

The stop-state torque 4054 has a 3-bit length and represents a duty ratio (to be referred to as a stop-state duty ratio hereinafter) of a period in which a voltage is actually applied to a 1-step action period of the stepping motor when the stepping motor is stopped. In one or more embodiments of the present invention, when the value of the stop-state torque 4054 is large, the stop-state duty ratio is high. As a result, a torque to maintain the stepping motor at a current step also increases. In one or more embodiments of the present invention, since the stop-state torque 4054 has a 3-bit length, the stop-state duty ratio is regulated in 8 stages. For example, the value of the stop-state torque 4054 is '000', the stop-state torque 4054 represents that the stop-state duty ratio is 0, i.e., the torque is 0 without applying a voltage to the stepping motor. On the other hand, the stop-state torque 4054 is '111', the stop-state duty ratio becomes 1.

The action-state torque 4055 has a 2-bit length and represents a duty ratio (to be referred to as an action-state duty ratio hereinafter) of a period in which a voltage is actually applied to a 1-step action period of the stepping motor when the stepping motor is rotated. In one or more embodiments of the present invention, when the value of the action-state torque 4055 is large, the action-state duty ratio is high. As a result, a torque to rotate the stepping motor also increases. In one or more embodiments of the present invention, since the action-state torque 4055 has a 2-bit length, the action-state duty ratio is regulated in 4 stages. For example, when the action-state torque 4055 is '00', the action-state duty ratio becomes 0.5. On the other hand, when the action-state torque 4055 is '11', the action-state duty ratio becomes 1.

The excitation mode flag 4056 has a 2-bit length to regulate an excitation direction of the stepping motor. In one or more embodiments of the present invention, the excitation mode flag 4056 that is '00' represents 2-phase excitation; '01' represents 1-2-phase excitation; '10' represents W1-2-phase excitation; and '11' represents 2W1-2-phase excitation. As the excitation method of the stepping motor, an excitation method except for the above excitation methods may be employed.

The acceleration data 4057 has a 4-bit length and represents acceleration obtained when the automatic acceleration/deceleration mode is on.

Figure 4C:
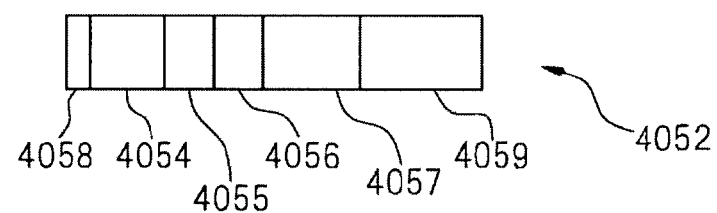
FIG. 4C is a diagram showing an example of a format of setting data when regulation is performed in an initial setting mode.

FIG. 4C is a diagram showing an example of a format of the setting data 4052 when the setting data 4052 is regulated in an initial setting mode. In this case, the setting data 4052 includes a default action setting flag 4058, a stop-state torque 4054, an action-state torque 4055, an excitation mode flag 4056, acceleration data 4057, and deceleration data 4059 that are sequentially arranged from the start.

The stop-state torque 4054, the action-state torque 4055, the excitation mode flag 4056, and the acceleration data 4057 are the same as the corresponding data shown in FIG. 4B, and a description thereof will be omitted.

The default action setting flag 4058 is a 1-bit flag representing whether the setting information included in the setting data 4052 is default setting information applied when individual setting information corresponding to the action information stored in the register 3 is not regulated. In one or more embodiments of the present invention, when the default action setting flag 4058 is '0', the setting information included in the setting data 4052 is default setting information.

The deceleration data 4059 has a 4-bit length and represents deceleration obtained when the automatic acceleration/deceleration mode is on.

Furthermore, the setting data 4052 may include data for regulating a flag for regulating the position coordinates of the movable body when a detection signal from a sensor that detects the position of the movable body is input, a flag for designating, when a plurality of sensors are arranged for one movable body, position coordinates of one specific sensor of the plurality of sensors, or the like.

The control command used when the drive unit is a solenoid may include data for regulating a destination position or a moving direction of the movable body, a duty ratio of an excitation signal output to each coil included in the solenoid, or the like.

Furthermore, the communication circuit 2 receives an identification address to specify a movable body drive device to be controlled by the control command from rendition CPU. The communication circuit 2, when the identification address is the same as a device address included in the control command, writes action information or setting information included in the control command in the register 3. On the other hand, the communication circuit 2 discards the received control command when the identification address is not the same as the device address.

Even though receiving timings of the identification address and the control command are different from each other, the communication circuit 2 may include a memory circuit for storing the identification address to make it possible to determine whether the identification address and the device address are matched with each other.

Furthermore, when the communication circuit 2 receives a load command to urgently stop the movable body from the rendition CPU, the communication circuit 2 outputs action information for urgent stop and the setting information which are stored in the register 3 to the duty ratio control circuit 4 and the motor control circuit 6. The format of the load command may be a format different from that of the control command. For example, the load command includes an identification code representing a load command and a flag representing a target movable body that are sequentially arranged from the start. The identification code may be, for example, a bit string that is not matched with any part of the control command.

Furthermore, each time one of command sets stored in the register 3 is executed for any one of the drive units controlled by the movable body drive device 1, the communication circuit 2 outputs, to the rendition CPU, an instruction completion signal representing that the command set is executed. As the instruction completion signal, for example, a single pulse signal that is output through a communication line set for each drive unit can be used. Alternatively, the instruction completion signal is a signal having pulses the numbers of which vary depending on drive units, and may be output to the rendition CPU through a signal line shared by the drive units.

Furthermore, when the communication circuit 2 receives a command for reading a command set stored in the register 3 from the rendition CPU, the communication circuit 2 may read all the command sets stored in the register 3 to transmit the command sets to the rendition CPU.

The register 3 includes the first memory circuit 31 of a so-called first-in first-out (FIFO) method having a storage capacity that can store a plurality of command sets in the drive units, and the second memory circuit 32 that can store a command set in an urgent stop state and the default setting information in units of drive units. The memory circuits of the register 3 are configured by, for example, a volatile programmable semiconductor memory circuit.

When a save location designation flag included in the received control command has a value representing that a normal action is regulated, the register 3 writes action information or setting information included in the control command in the first memory circuit 31. In this case, with respect to an interested movable body, when the register 3 receives setting information of the movable body by the time at which, after one piece of action information is received, the next action information is received, the action information and the setting information are used as one command set. On the other hand, with respect to an interested movable body, when the register 3 does not receive setting information of the movable body by the time at which, after one piece of action information is received, the next action information is received, when the action information is read, default setting information stored in the second memory circuit 32 is copied in the first memory circuit 31 to form a command set of the setting information and the action information.

Figure 5:
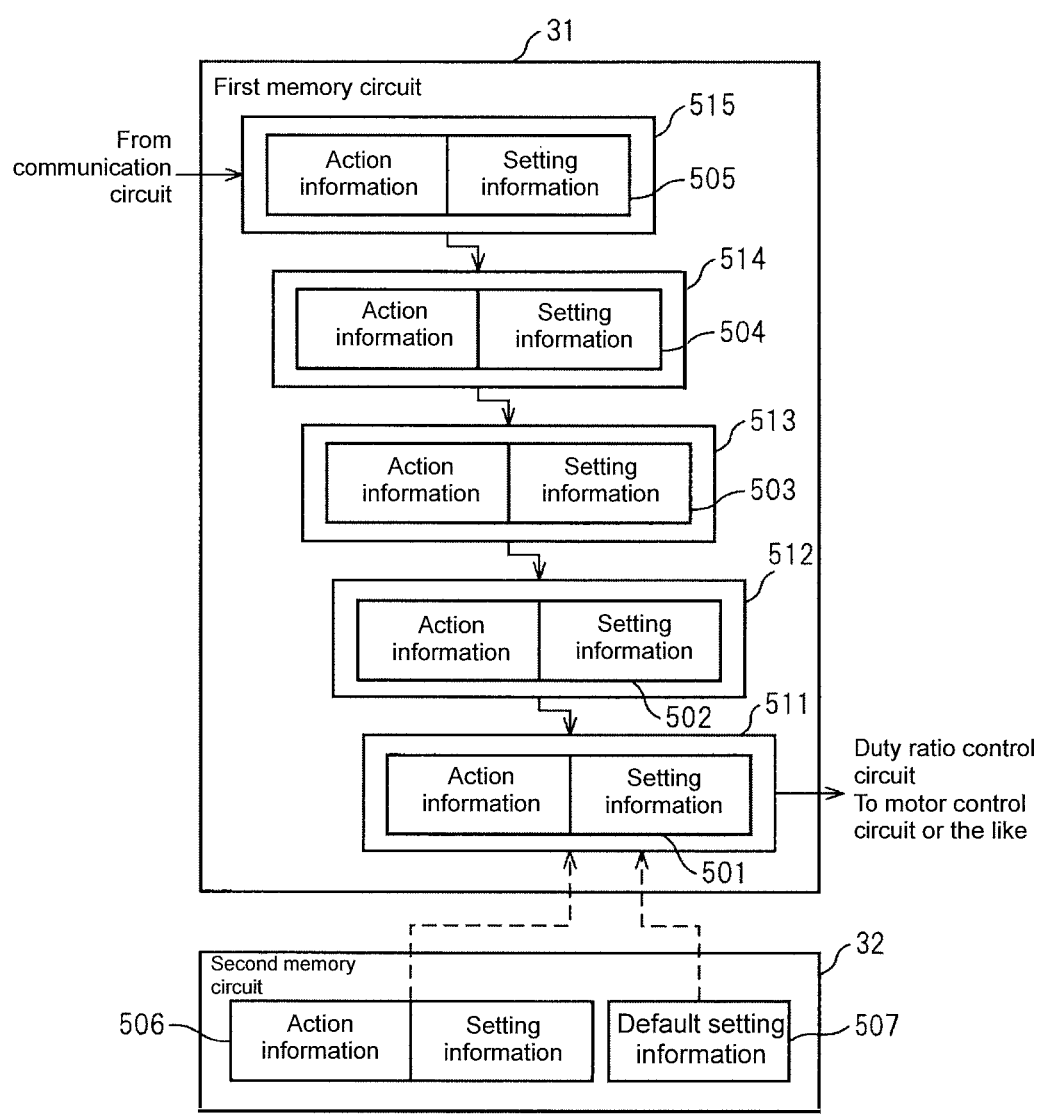
FIG. 5 is a conceptual diagram showing a relationship between writing of a command set and an execution order used in control of a stepping motor.

FIG. 5 is a conceptual diagram showing a relationship between writing of a command set and an execution order used in control of the stepping motor. In FIG. 5, only a command set for one stepping motor is shown. The register 3 stores command sets as shown in FIG. 5 in units of stepping motors controlled by the movable body drive device 1.

In FIG. 5, each of command sets 501 to 505 stored in the first memory circuit 31 includes action information and setting information. It is assumed that a command set located on a lower side is early written. Thus, in one or more embodiments of the present invention, a command set 501 is most early written, and a command set 505 is lately written. Each of the command sets is stored in any one of buffers 511 to 515. A command set is read from the buffer (buffer 511 on the lowermost side in FIG. 5) closest to the read side, and the command set is transferred to the duty ratio control circuit 4 and the motor control circuit 6. The drive unit is controlled according to the command set to drive the movable body. Each time one command set is executed, each of the command sets is transferred to the buffer on the side next to the read side. When the command sets are stored in all the buffers, when the register 3 further receives the next action information or the next setting information, action information or setting information stored in the buffer 515 closest to the write side is updated into newly received action information or newly received setting information.

In the second memory circuit 32, an urgent-stop command set 506 and default setting information 507 are stored. The urgent-stop command set 506, when the movable body drive device 1 receives a load command, is transferred to the buffer 511 closest to the read side, read from the buffer 511, and transferred to the duty ratio control circuit 4 and the motor control circuit 6. In this case, the command sets stored in the other buffers in the first memory circuit 31 are erased.

When only the action information is stored in the buffer 511 closest to the read side, the default setting information 507 is transferred to the buffer 511 to form a command set. Thereafter, the command set is read and transferred to the duty ratio control circuit 4 and the motor control circuit 6.

The duty ratio control circuit 4 generates a continuous pulse signal that is regulated by the setting information of the command set every predetermined unit period, has a predetermined voltage value in only a period corresponding to a stop-state duty ratio or an action-state duty ratio, and is obtained by continuing pulses each having a voltage value different from the predetermined voltage value in the other period. For this reason, the duty ratio control circuit 4, for example, has a processor and a nonvolatile memory circuit. The memory circuit stores, for example, a reference table showing a relationship between the values of a stop-state duty ratio and an action-state duty ratio that are regulated by the setting information and an actual duty ratio. The processor included in the duty ratio control circuit 4 determines an actual duty ratio with reference to the reference table. The processor generates the continuous pulse signal according to the determined duty ratio. The predetermined unit period, for example, is set to 1/100 to 1/5 of an action period of one step when the rotational speed of the stepping motor included in the action information is maximum.

The duty ratio control circuit 4 supplies the generated continuous pulse signal to the motor control circuit 6 or the solenoid control circuit 7.

The sensor interface unit 5 has an interface circuit that receives a detection signal from a sensor for detecting the position of a movable body. The sensor interface unit 5 may have, for example, input terminals that vary depending on sensors.

In the case, the sensor has, for example, a light source such as a light emitting diode and a light receiving element such as a photodiode which is arranged to face the light source so as to be able to receive light from the light source. The sensor is arranged at, for example, any one of the ends of the movable range of the movable body, and the sensor, when the movable body can move in horizontal directions, is arranged at the left end or the right end of the movable range. Only when the movable body reaches the end at which the sensor is arranged, light from the light source is shielded with the movable body to decrease an amount of light detected by the light receiving element, so that the sensor detects that the movable body reaches the end. When the sensor detects the movable body, the sensor outputs a detection signal representing the detection to the sensor interface unit 5.

The sensor may be a proximity sensor based on another principle like a magnet sensor. For one movable body, a plurality of sensors may be arranged. In this case, the sensors are arranged at different positions within the movable range of the movable body, respectively. For example, when two sensors are arranged for one movable body, the two sensors are arranged at both the ends of the movable range of the movable body, respectively.

When the sensor interface unit 5 receives a detection signal from a sensor for detecting the position of a movable body driven by a stepping motor, the sensor interface unit 5 notifies the motor control circuit 6 of the detection signal. When the sensor interface unit 5 receives a detection signal from a sensor for detecting the position of a movable body driven by a solenoid, the sensor interface unit 5 notifies the solenoid control circuit 7 of the detection signal. In this case, the sensor interface unit 5 may transfer detection signals of sensors to the motor control circuit 6 or the solenoid control circuit 7 such that times elapsed after the reception of the detection signals are made different from each other by different delay times between the sensors to make it possible to discriminate the detection signals of the sensors arranged to which movable body from each other. Alternatively, the sensor interface unit 5 may transfer the detection signal to the motor control circuit 6 or the solenoid control circuit 7 together with identification codes varying depending on the sensors.

The motor control circuit 6 controls a stepping motor serving as an example of the drive unit according to a command set read from the register 3. In one or more embodiments of the present invention, the motor control circuit 6 includes a first control circuit 61 to control one stepping motor and a second control circuit 62 to control the other stepping motor. The control circuits 61 and 62 have, for example, processors, respectively, and independently receive commands from the register 3 to control a stepping motor for driving a corresponding movable body. The motor control circuit 6 has a memory circuit 63 that stores a current position of each movable body and a position at the start of action in the previous step. The memory circuit 63 is an example of a storage unit that stores the current position of the movable body.

Each of the control circuits 61 and 62, for example, has 6 output terminals to make it possible to control a unipolar stepping motor. Alternatively, each of the control circuits 61 and 62 may have, for example, 4 output terminals to make it possible to control a bipolar stepping motor. Furthermore, each of the control circuits 61 and 62 may have 6 output terminals so that output terminals for outputting signals may be changed depending on an identification signal representing a unipolar type or a bipolar type and received from the rendition CPU.

For example, each of the control circuits 61 and 62, when the coordinates of a destination position included in action information are designated as an absolute value, compares the coordinates of a current position of a movable body with the coordinates of a destination position. Each of the control circuits 61 and 62 determines a moving direction of the movable body by a sign of a difference between the coordinates of the destination position and the coordinates of the current position. For example, as shown in FIG. 2A, when the mobile body linearly moves along the horizontal direction and when the number of steps representing the position coordinates of the movable body is a positive larger number, the movable body comes close to the right end of the movable range. In this case, each of the control circuits 61 and 62 determines that the movable body is moved to the right when a difference obtained by subtracting the coordinates of the current position from the coordinates of the destination position is a positive value, and determines that the movable body is moved to the left when the difference is a negative value. When the mobile body rotationally moves by using a predetermined fixed point as a rotating axis and when the number of steps representing the position coordinates of the movable body is a positive larger number, the movable body comes close to the end in the clockwise direction of the movable range. In this case, each of the control circuits 61 and 62 determines that the movable body is moved in the clockwise direction when a difference obtained by subtracting the coordinates of the current position from the coordinates of the destination position is a positive value, and determines that the movable body is moved in the counterclockwise direction when the difference is a negative value.

When a set mode of the destination position is the relative coordinate designation mode, each of the control circuits 61 and 62 determines that the movable body is moved in the designated moving direction.

When a set mode of the destination position is the inertial movement mode, each of the control circuits 61 and 62 specifies, based on the sign of a difference between the current position of the movable body and a position in the previous step stored in the memory circuit, a moving direction in the immediately previous action of the movable body. Each of the control circuits 61 and 62 determines that the movable body is moved in the specific moving direction.

When the moving direction of the movable body is determined, each of the control circuits 61 and 62 determines an action period corresponding to one step depending on the rotational speed of the stepping motor.

In this case, when the automatic acceleration/deceleration mode is on, each of the control circuits 61 and 62 adjusts the rotational speed of the stepping motor according to acceleration data or deceleration data included in the set information.

Figure 6A:
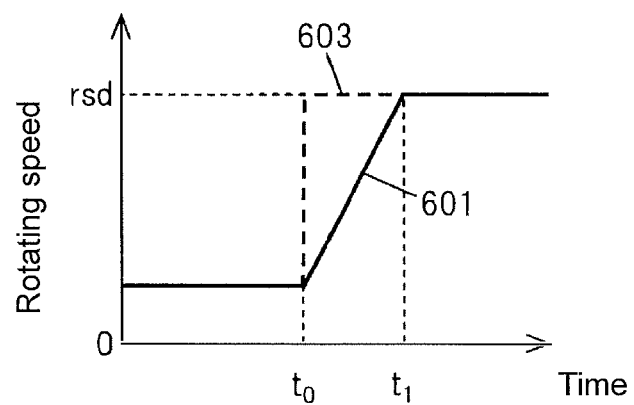
FIG. 6A is a diagram showing an example of a time change in rotational speed when a rotational speed of the stepping motor is increased.
Figure 6B:
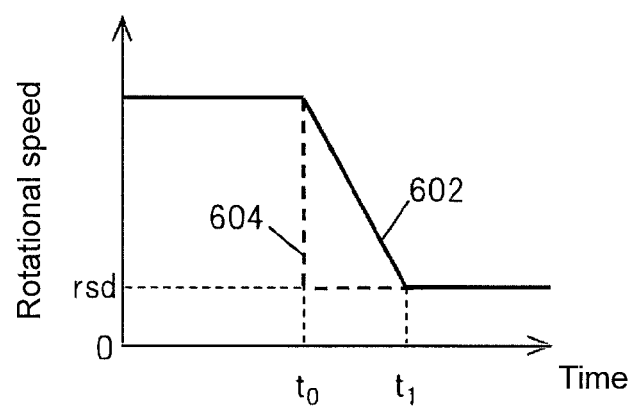
FIG. 6B is a diagram showing an example of a time change in rotational speed when a rotational speed of the stepping motor is decreased.

FIG. 6A is a diagram showing an example of a time change in rotational speed when the rotational speed of the stepping motor is increased, and FIG. 6B is a diagram showing an example of a time change in rotational speed when the rotational speed of the stepping motor is decreased. In FIGS. 6A and 6B, the abscissa represents time, and the ordinate represents the rotational speed of the stepping motor. A graph 601 represents a relationship between an elapsed time and a rotational speed when the rotational speed increases, and a graph 602 represents a relationship between an elapsed time and a rotational speed when the rotational speed decreases. Time $t_0$ represents time at which each of the control circuits 61 and 62 starts execution of an interested command set. Here, rsd represents speed data regulated by speed data included in action information.

Before $t_0$, the stepping motor rotates at a rotational speed designated by the previous command set of the interested command set. When it is time $t_0$, i.e., when the execution of the interested command set is started, each of the control circuits 61 and 62 gradually accelerates or decelerates the rotational speed of the stepping motor at acceleration or deceleration regulated by the acceleration data or the deceleration data included in the setting information until the movable body moves from the current position for a distance corresponding to a predetermined first number of steps (for example, 5 to 20 steps) of the stepping motor. At time $t_1$ at which the movement for the distance is finished, the rotational speed of the stepping motor is adjusted to the rotational speed regulated by the speed data included in the action information. After time $t_1$, the rotational speed of the stepping motor is maintained at the rotational speed regulated by the speed data.

For example, each of the control circuits 61 and 62 accelerates the stepping motor when a rotational speed represented by speed data designated by a command set to be executed is higher than a rotational speed represented by speed data designated by the previously executed command set. On the other hand, each of the control circuits 61 and 62 decelerates the stepping motor when the rotational speed represented by the speed data designated by the command set to be executed is lower than the rotational speed represented by the speed data designated by the previously executed command set.

Figure 7A:
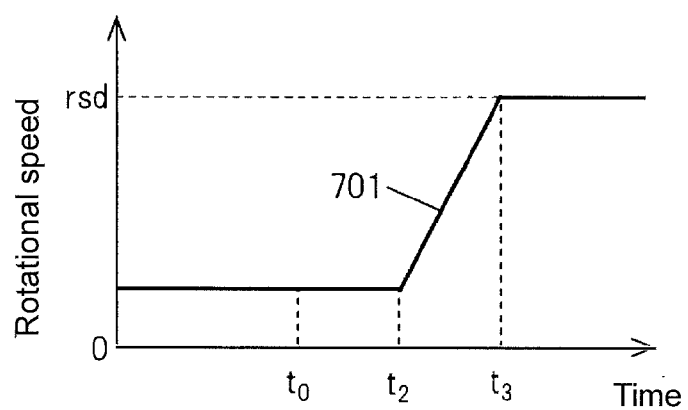
FIG. 7A is a diagram showing an example of a time change in rotational speed when a rotational speed of the stepping motor is increased in a modification.
Figure 7B:
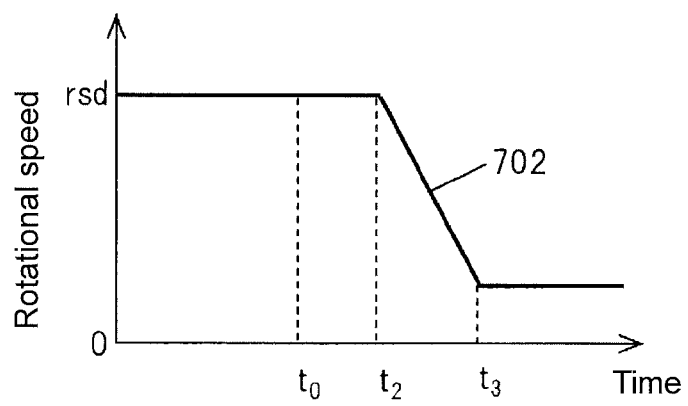
FIG. 7B is a diagram showing an example of a time change in rotational speed when a rotational speed of the stepping motor is decreased in the modification.

FIG. 7A is a diagram showing an example of a time change in rotational speed when the rotational speed of the stepping motor is increased in a modification, and FIG. 7B is a diagram showing an example of a time change in rotational speed when the rotational speed of the stepping motor is decreased in the modification. In FIGS. 7A and 7B, the abscissa represents time, and the ordinate represents the rotational speed of the stepping motor. A graph 701 represents a relationship between an elapsed time and a rotational speed when the rotational speed increases, and a graph 702 represents a relationship between an elapsed time and a rotational speed when the rotational speed decreases. Time $t_0$ represents time at which each of the control circuits 61 and 62 starts execution of an interested command set. Here, rsd represents speed data regulated by speed data included in action information.

According to the modification, after time $t_2$ at which the movable body reaches a position being ahead of target coordinates by a distance corresponding to a predetermined second number of steps (for example, 5 to 20 steps) of the stepping motor, each of the control circuits 61 and 62 gradually accelerates or decelerates the rotational speed of the stepping motor at acceleration or deceleration depending on information of acceleration or deceleration included in the setting information. Each of the control circuits 61 and 62 adjusts the rotational speed of the stepping motor such that the rotational speed of the stepping motor becomes the rotational speed represented by the speed data at time $t_3$ at which the movable body reaches the target coordinates.

Furthermore, the movable body drive device 1 may start movement of the movable body at a timing at which an action corresponding to one command set is started, and may stop the movable body at a timing at which the action is ended. In this case, when the automatic acceleration/deceleration mode is on, each of the control circuits 61 and 62, when movement of the movable body is started, gradually accelerates the rotational speed of the stepping motor from the start of movement at acceleration included in the setting information. Each of the control circuits 61 and 62 adjusts the rotational speed of the stepping motor such that the rotational speed of the stepping motor becomes the rotational speed regulated by the speed data at a timing at which the movable body moves for a distance corresponding to a predetermined third number of steps (for example, 5 to 20 steps) of the stepping motor. Each of the control circuits 61 and 62 maintains the rotational speed until the movable body reaches a deceleration start position being ahead of the target coordinates by a distance corresponding to the third number of steps of the stepping motor. Each of the control circuits 61 and 62 gradually decelerates the rotational speed of the stepping motor at deceleration depending on the information of deceleration included in the setting information after the movable body reaches the deceleration start position. Each of the control circuits 61 and 62 adjusts the rotational speed of the stepping motor such that the rotational speed of the stepping motor becomes 0 rpm when the movable body reaches the target coordinates.

As described above, by using the automatic acceleration/deceleration mode, the movable body drive device 1 suppresses the movable body from being sharply accelerated when movement is started from the stop state and from being sharply braked when the movable body is stopped at the end of the action designated by the action information so that the stepping motor is prevented from being overloaded. For this reason, the movable body drive device 1 can prevent the movable body from following the rotation of the stepping motor or prevent the stepping motor from being stepped out.

The first to third numbers of steps, the acceleration, and the deceleration are determined with reference to, for example, a reference table representing a relationship between the values of indexes of the acceleration and the deceleration included in the setting information and the actual values of the numbers of steps, the acceleration and the deceleration, the reference table being stored in the memory circuit 63.

On the other hand, when the automatic acceleration/deceleration mode is off, each of the control circuits 61 and 62, as in graphs 603 and 604 indicated with dotted lines in FIGS. 6A and 6B, sets the rotational speed of the stepping motor to the rotational speed regulated by the speed data included in action information until the movable body reaches the target coordinates immediately after the start of movement.

Each of the control circuits 61 and 62 determines an action period of one step corresponding to the rotational speed with reference to, for example, a reference table representing a relationship between the rotational speed and the action period per step stored in the memory circuit 63.

Thereafter, each of the control circuits 61 and 62, according to an excitation method and a moving direction corresponding to the values of an excitation mode flag included in the setting information, generates a pulse-like drive signal corresponding to the determined action period and applied to each terminal of the stepping motor. In this case, each of the control circuits 61 and 62 may generate a drive signal corresponding to the action period per step, the excitation method, and the moving direction according to a program stored in the memory circuit 63 and executed by each of the control circuits 61 and 62 to generate a drive signal. The signal waveform of a drive signal output to each of the terminals and corresponding to the excitation method is known as disclosed in, for example, Japanese Unexamined Patent Publication Nos. 6-189597 and 2009-247833. For this reason, the detailed description thereof is omitted here.

Furthermore, each of the control circuits 61 and 62 multiples a continuous pulse signal received from the duty ratio control circuit 4 by the drive signal thereof to perform pulse width modulation of a drive signal applied to each of the terminals. In this manner, the movable body drive device 1 decreases the duty ratio of the pulse signal to make it possible to suppress a heat value of the stepping motor to be controlled. On the other hand, the duty ratio of the pulse signal is increased to make it possible to increase the torque of the stepping motor to be controlled. Each of the control circuits 61 and 62 outputs a pulse-width-modulated drive signal of each terminal.

Each of the control circuits 61 and 62, each time a drive signal corresponding to one step is output, updates the current position of the mobile body stored in the memory circuit 63 and a position at the start of action in the previous step. More specifically, when the movable body moves in a direction in which the number of steps increases, each of the control circuits 61 and 62 adds 1 to each of the number of steps representing the current position and the number of steps representing the position in the previous step. On the other hand, when the movable body moves in a direction in which the number of steps decreases, each of the control circuits 61 and 62 subtracts 1 from each of the number of steps representing the current position and the number of steps representing the position in the previous step.

When the target coordinates are designated as an absolute value, each time outputting of a drive signal corresponding to one step is ended, each of the control circuits 61 and 62 determines whether coordinates representing a current position of a movable body are matched with the coordinates of a destination position. When the coordinate value representing the current position of the mobile body is not matched with the coordinates of the destination position, each of the control circuits 61 and 62 generates a drive signal pulse-width-modulated by one step again and outputs the drive signal to each of the terminals to update the current position or the like. On the other hand, when the coordinate value representing the current position of the movable body is not matched with the target coordinates, each of the control circuits 61 and 62 determines that an action of the movable body corresponding to one command set is ended.

On the other hand, the coordinates of the destination position is designated as a relative value, each of the control circuits 61 and 62 outputs drive signals corresponding to the number of steps designated by the relative value to each of the terminals and updates the current position or the like by the number of steps. Thereafter, each of the control circuits 61 and 62 determines that an action of the movable body corresponding to one command set is ended.

When each of the control circuits 61 and 62 determines that the action of the movable body is ended, each of the control circuits 61 and 62 transmits an instruction completion signal to the rendition CPU through the communication circuit 2.

When each of the control circuits 61 and 62, when an automatic correction flag is on, receives a detection signal from a sensor for detecting the position of the movable body driven by the stepping motor corresponding to the control circuit from the sensor interface unit 5, each of the control circuits 61 and 62 updates the coordinate value representing the position of the movable body stored in the memory circuit 63 to the coordinate value representing a detection position serving as a position where a sensor corresponding to the detection signal detects the movable body. In this manner, each time the movable body reaches the detected position of the sensor, the current position of the movable body stored in the movable body drive device 1 is corrected to a current position. For this reason, even through the movable body cannot follow the rotation of the stepping motor, the movable body drive device 1 can comprehend the correct position of the movable body.

The solenoid control circuit 7 generates an excitation signal to each coil according to the control command received from the register 3 and the moving direction or the destination position of the movable body included in the control command, and outputs the excitation signal to each of the coils included in the solenoid. The solenoid control circuit 7, like the motor control circuit 6, may have a memory circuit for storing the current position of the movable body driven by the solenoid. When the control command includes the destination position of the movable body, the solenoid control circuit 7 compares the coordinates of the destination position with the coordinates of the current position to determine the moving direction of the movable body, and may generate an excitation signal to each of the coil such that the coils are sequentially excited along the moving direction from the coil closest to the current position.

As has been described above, since the movable body drive device comprehends the current position of the movable body driven by the stepping motor, a host control device such as a rendition CPU simply designates the target coordinates of the movable body to make it possible to determine the moving direction of the movable body, and the movable body can be moved to the target coordinates. For this reason, the host control device need not comprehend the current position of the movable body, and need not determine the moving direction of the movable body depending on the difference between the coordinates of the current position and the target coordinates. Thus, the movable body drive device can reduce the load of the host control device with respect to driving of the movable body.

The present invention is not limited to the above embodiments. For example, according to a modification, a movable body drive device need not have a solenoid control circuit. According to another modification, a movable body drive device, as in the inertial movement mode shown in FIG. 2C, need not accept a control command for specifying target coordinates by only a moving distance related to the current position. In this case, since the movable body drive device need not calculate a moving direction of the movable body at the present, a memory circuit of a motor control circuit need only store only the current position of the movable body.

According to still another modification, the coordinates of a current position of a movable body and position coordinates in execution of a previous step may be stored in a register.

According to still another modification, one control command may include both action information and setting information.

The movable body drive device according to one or more embodiments of the present invention may be mounted on a game machine such as a pinball game machine or a reel gaming machine.

Figure 8:
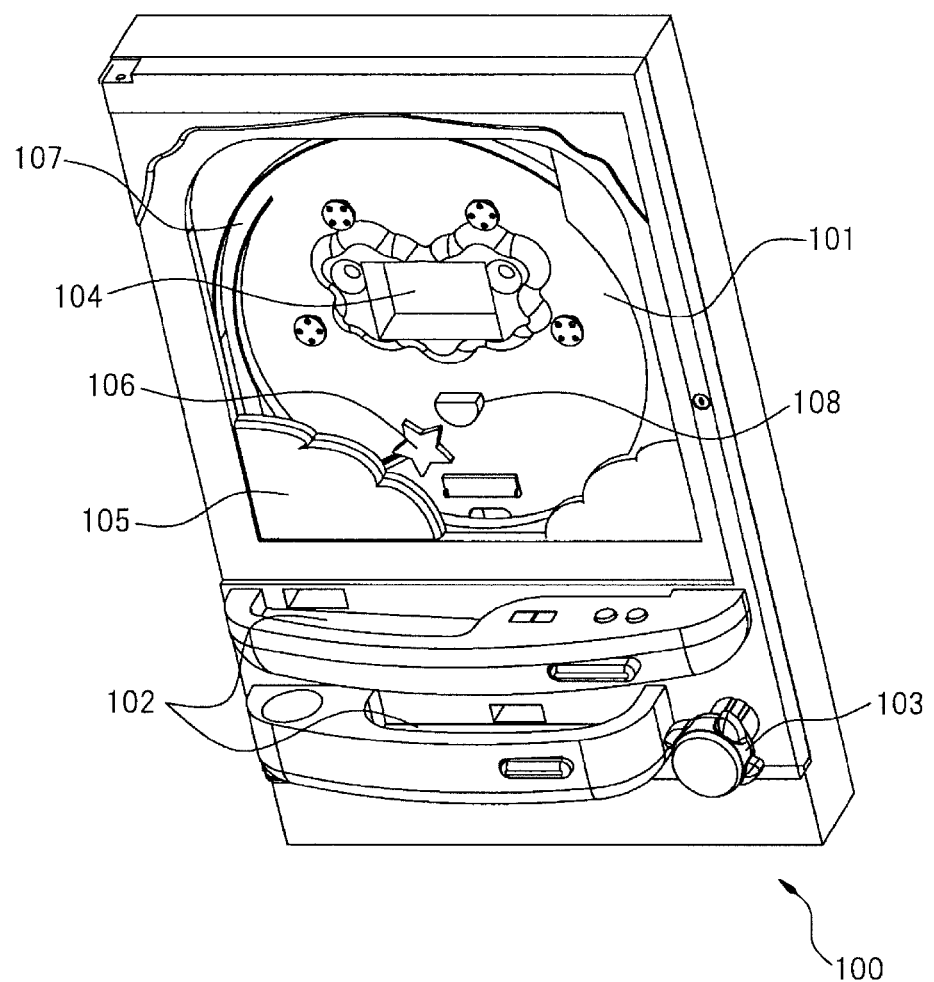
FIG. 8 is a schematic perspective view of a pinball game machine including a movable body device according to one or more embodiments of the present invention.
Figure 9:
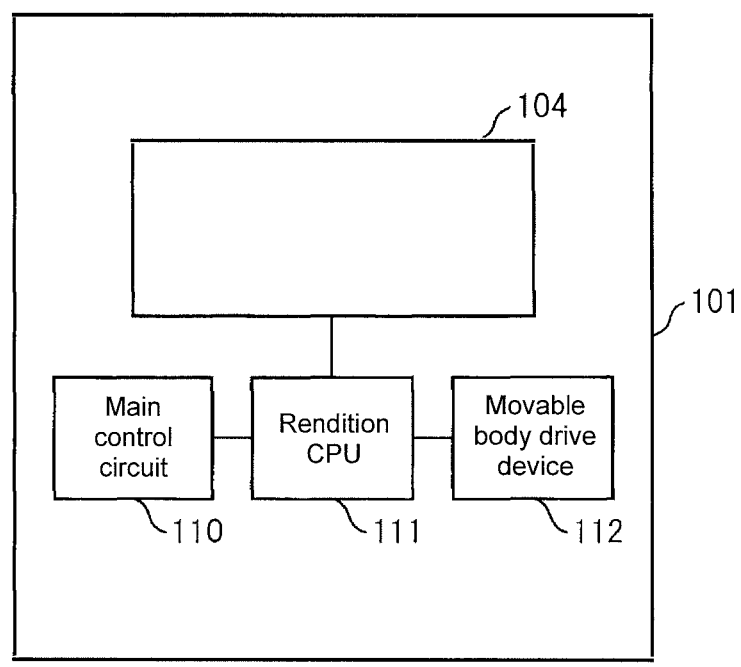
FIG. 9 is a schematic rear view of a pinball game machine including the movable body drive device according to one or more embodiments of the present invention.

FIG. 8 is a schematic perspective view of a pinball game machine 100 including the movable body drive device according to one or more embodiments of the present invention. FIG. 9 is a schematic rear view of the pinball game machine 100. As shown in FIG. 8, the pinball game machine 100 has a game board 101 arranged in a large part of an area extending from an upper portion to a middle portion and serving as a game machine main body, a ball receiving unit 102 arranged at a lower side of the game board 101, an operation unit 103 having a handle, and a display device 104 arranged at almost the center of the game board 101.

The pinball game machine 100 includes, for rendering the game, a fixed accessory part 105 arranged on a lower part of the game board 101 on the front surface of the game board 101 and a movable accessory part 106 arranged between the game board 101 and the fixed accessory part 105. A rail 107 is arranged on the side of the game board 101. On the game board 101, a large number of obstacle pins (not shown) and at least one winning device 108 are arranged.

The operation unit 103 shoots a game ball with a predetermined force by using a shooting device (not shown) depending on a turning angle of the handle by an operation of a player. The shot game ball moves upward along the rail 107 and drops between the large number of obstacle pins. When a sensor (not shown) detects that a game ball enters any one of the winning devices 108, a main control circuit 110 arranged on the rear surface of the game board 101 delivers a predetermined number of game balls depending on the winning device 108 which the game ball enters to the ball receiving unit 102 through a ball delivery device (not shown). Furthermore, the main control circuit 110 displays various videos on the display device 104 through a rendition CPU 111 arranged on the rear surface of the game board 101.

The movable accessory part 106 is an example of a movable body moving depending on a state of game, and is driven by the movable body drive device 112 arranged on the rear surface of the game board 101. As the movable body drive device 112, a movable body drive device according to one or more embodiments of the present invention can be used. When the game machine 100 has not only the movable accessory part 106 but also the movable body, for example, when a movable body that makes the size of an opening variable is arranged on the opening of the winning device 107, the movable body may also be driven by the movable body drive device 112.

Figure 10A:
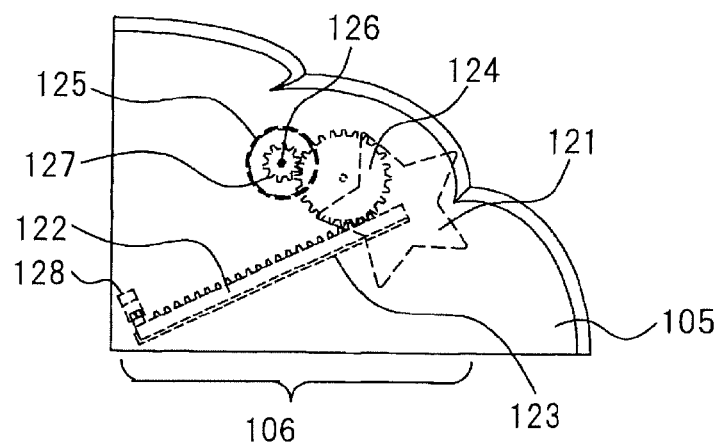
FIG. 10A is a schematic front view of a movable accessory part when viewed through a fixed accessory part.
Figure 10B:
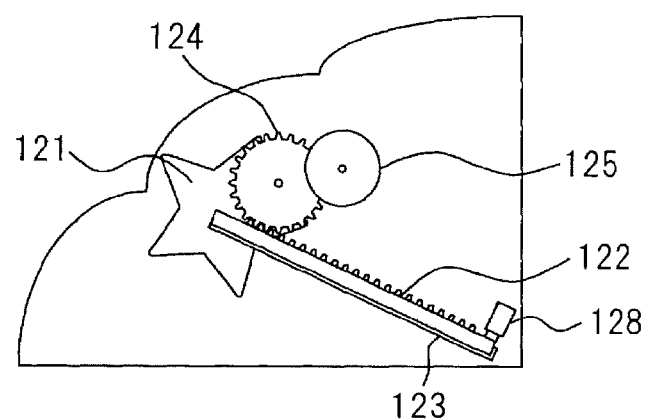
FIG. 10B is a schematic rear view showing a case where the movable accessory part is located at an end of a movable range when viewed from the rear surface side of the fixed accessory part.
Figure 10C:
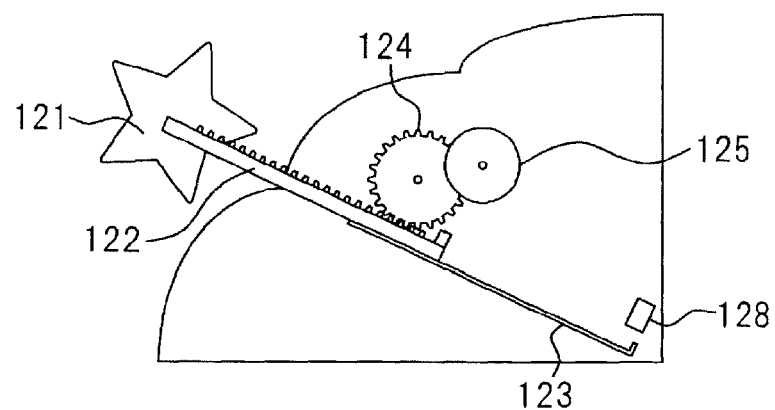
FIG. 10C is a schematic rear view showing a case where the movable accessory part is located at the other end of the movable range when viewed from the rear surface side of the fixed accessory part.

FIG. 10A is a schematic front view of a movable accessory part 106 driven by the movable body drive device 112 when viewed through the fixed accessory part 105. FIG. 10B is a schematic rear view of a case where the movable accessory part 106 is located at an end of a movable range when viewed from the rear surface side of the fixed accessory part 105. FIG. 10C is a schematic rear view in a case where the movable accessory part 106 is located at the other end of the movable range when viewed from the rear surface side of the fixed accessory part 105.

In one or more embodiments of the present invention, the movable accessory part 106 has a star decoration member 121 and a rod-like support member 122 that holds the decoration member 121 at one end thereof. The support member 122, on the rear surface side of the fixed accessory part 105, in an oblique direction from the lower left end of the game board 101 to the upper right thereof, is engaged with a rail 123 arranged adjacent to the lower end of the support member 122, and is held such that the support member 122 can linearly move along the rail 123. In this example, as shown in FIG. 10B, when the movable accessory part 106 is located on the lower left end of the movable range of the movable accessory part 106, the decoration member 121 is hidden behind the fixed accessory part 105 and concealed from a player when viewed from the front side of the game board 101. On the other hand, as shown in FIG. 10C, when the movable accessory part 106 is located at the upper right end of the movable range of the movable accessory part 106, the entire decoration member 121 is located on the center side of the game board 101 with reference to the fixed accessory part 105, and the player can view the entire decoration member 121.

On the upper surface side of the support member 122, teeth serving as a linear gear are formed, the teeth are engaged with a reduction gear 124 arranged near the position of the lower left end of the support member 122 when the movable accessory part 106 is located at the upper right end of the movable range. The reduction gear 124 is engaged with a gear 127 attached to a rotary shaft 126 of the stepping motor 125. For this reason, when the stepping motor 125 rotates at a predetermined angle, the movable accessory part 106 moves through the gear 127 and the reduction gear 124 by a predetermined moving distance corresponding to the rotating angle. The stepping motor 125 is controlled by the movable body drive device 112.

A sensor 128 is arranged near the position of the lower left end of the support member 122 when the movable accessory part 106 is located at the lower left end of the movable range, and the sensor 128 generates a detection signal when the movable accessory part 106 reaches the lower left end of the movable range and transmits the detection signal to the movable body drive device 112. The sensor 128 is, for example, a magnet sensor that detects a magnetic body arranged at the lower left end of the support member 122 to make it possible to detect that the movable accessory part 106 reaches the lower left end of the movable range. Alternatively, the sensor 128 may be an optical sensor having a light emitting diode and a light receiving element.

Based on a state signal representing a state of a game transmitted from the main control circuit 110 to the rendition CPU 111, the rendition CPU 111 determines the target coordinates of the movable accessory part 106 and generates a control command according to the determination. The rendition CPU 111 outputs the generated control command to the movable body drive device 112. For example, before a game ball enters the winning device 107, the rendition CPU 111 transmits, to the movable body drive device 112, a control command for designating the lower left end of the movable range of the movable accessory part 106 as a destination position such that the movable accessory part 106 is hidden behind the fixed accessory part 105. On the other hand, when it is detected that a game ball enters the winning device 107 to input a state signal representing that the game ball enters the winning device 107 from the main control circuit 110 to the rendition CPU 111, the rendition CPU 111 generates a control command for designating an upper right end of the movable range of the movable accessory part 106 as a destination position and transmits the control command to the movable body drive device 112.

In this manner, a person skilled in the art can make various modifications in accordance with embodiments within the scope of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF SYMBOLS 1 movable body drive device
2 communication circuit
3 register
31 first memory circuit
32 second memory circuit
4 duty ratio control circuit
5 sensor interface unit
6 motor control circuit
61, 62 control circuit
63 memory circuit
7 solenoid control circuit
100 pinball game machine
101 game board
102 ball receiving unit
103 operation unit
104 display device
105 fixed accessory part
106 movable accessory part
107 rail
108 winning device
110 main control circuit
111 rendition CPU
112 movable body drive device
121 decoration member
122 support member
123 rail
124 reduction gear
125 stepping motor
126 rotary shaft
127 gear
128 sensor

The invention claimed is:

1. A game machine comprising:
a game machine main body;
a movable body arranged on a front surface of the game machine main body such that the movable body can be moved within a predetermined movable range;
a stepping motor that drives the movable body;
a movable body drive device that controls the stepping motor; and
a rendition control unit that controls a rendition depending on a state of a game,
wherein the rendition control unit generates a control command for regulating a destination position of the movable body depending on the state of the game and serially transmits the control command to the movable body drive device, and
wherein the movable body drive device comprises:
a first storage unit that stores a plurality of action commands;
a communication unit that receives the control command, the control command comprising a first action command corresponding to one of the plurality of action commands, a first index representing a rotational speed of the stepping motor, a second index representing acceleration or deceleration of the stepping motor, and at least one of: a save location designation flag, an automatic correction flag, and a coordinate designation mode flag;
a second storage unit that stores a current position of the movable body; and
a control unit that determines, based on a difference between the destination position and the current position or a moving direction in a first action of the movable body, a moving direction in a second action of the movable body, wherein the control unit controls the stepping motor such that the movable body is moved along the moving direction in the second action until the movable body reaches the destination position,
wherein the second action precedes the first action in time, and
wherein the control unit controls the stepping motor, based on the first action command such that the rotational speed of the stepping motor is accelerated or decelerated at the acceleration or the deceleration represented by the second index until: (a) the movable body moves a distance from the current position to an intermediate position that is between the current position and the destination position and corresponds to a first number of steps of the stepping motor, and (b) the rotational speed becomes the rotational speed represented by the first index when the movable body moves for the distance.

2. The game machine according to claim 1, wherein the control unit further controls the stepping motor such that the rotational speed of the stepping motor is accelerated or decelerated at the acceleration or the deceleration represented by a third index when the movable body moves a second distance to a second intermediate position that is between the intermediate position and the destination position, the second distance corresponding to a second number of steps of the stepping motor, and the rotational speed becomes the rotational speed represented by the first index when the movable body reaches the destination position.

3. The game machine according to claim 1,
wherein the destination position included in the control command is expressed by the distance to be moved by the movable body from the current position,
wherein the second storage unit further stores a position of the first action of the movable body, and
wherein the control unit calculates the moving direction of the first action of the movable body based on a difference between the position of the first action and the current position.

4. The game machine according to claim 1,
wherein the control command comprises a fourth index representing a ratio of a period in which a voltage is applied to the stepping motor to a first period corresponding to an action of one step of the stepping motor,
wherein the movable body drive device further comprises a duty ratio control unit that sets a second period shorter than the first period as one cycle and generates a continuous pulse signal obtained by continuing pulses each having a predetermined voltage value with the ratio represented by the fourth index in the second period, and
wherein the control unit performs pulse width modulation to a drive signal for controlling an action in each step of the stepping motor by the continuous pulse signal and outputs the pulse-width-modulated drive signal to the stepping motor.

* * * * *